US007650169B2

(12) United States Patent
Seo et al.

(10) Patent No.: US 7,650,169 B2
(45) Date of Patent: Jan. 19, 2010

(54) METHOD OF RAISING SCHEDULE ALARM WITH AVATARS IN WIRELESS TELEPHONE

(75) Inventors: Jeong-Wook Seo, Daegu (KR); Eun-Jung Seo, Busan (KR); Wei-Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 705 days.

(21) Appl. No.: 11/007,170

(22) Filed: Dec. 9, 2004

(65) Prior Publication Data
US 2005/0124388 A1 Jun. 9, 2005

(30) Foreign Application Priority Data
Dec. 9, 2003 (KR) .................. 10-2003-0089093
Nov. 30, 2004 (KR) .................. 10-2004-0099450

(51) Int. Cl.
*H04B 1/38* (2006.01)
*H04M 1/00* (2006.01)
*H04Q 7/20* (2006.01)

(52) U.S. Cl. .............. 455/566; 455/567; 455/435.1
(58) Field of Classification Search .......... 455/412.2, 455/414.1, 466, 566, 567, 550.1, 412.1, 415, 455/435.1
See application file for complete search history.

(56) References Cited

U.S. PATENT DOCUMENTS

| 6,094,587 | A * | 7/2000 | Armanto et al. ............. 455/567 |
| 6,263,209 | B1 * | 7/2001 | Reed et al. ................ 455/456.3 |
| 6,408,188 | B1 * | 6/2002 | Park ........................... 455/466 |
| 6,738,635 | B1 * | 5/2004 | Lewis et al. ................. 455/466 |
| 6,968,199 | B2 * | 11/2005 | Nagashima .................. 455/502 |
| 7,133,693 | B2 * | 11/2006 | Kamata et al. ............. 455/556.2 |
| 7,177,629 | B1 * | 2/2007 | Deeds ......................... 455/415 |
| 7,346,630 | B2 * | 3/2008 | Eichstaedt et al. ......... 707/104.1 |
| 7,433,714 | B2 * | 10/2008 | Howard et al. .............. 455/567 |
| 7,457,642 | B2 * | 11/2008 | Kamata et al. .............. 455/566 |
| 2002/0094847 | A1 * | 7/2002 | Han ............................ 455/567 |
| 2003/0087668 | A1 * | 5/2003 | Lee et al. .................... 455/556 |
| 2005/0020301 | A1 * | 1/2005 | Lee ........................... 455/556.1 |

FOREIGN PATENT DOCUMENTS

| CN | 1418037 | 5/2003 |
| EP | 1 280 367 | 1/2003 |
| EP | 1 280 367 A | 1/2003 |
| WO | WO 01/49051 A | 7/2001 |
| WO | WO 2004/025974 A | 3/2004 |

* cited by examiner

*Primary Examiner*—Tilahun Gesesse
(74) *Attorney, Agent, or Firm*—Roylance, Abrams, Berdo & Goodman, L.L.P.

(57) ABSTRACT

Disclosed is a method of processing a schedule alarm message in a portable terminal comprising analyzing a message when the message is received in the portable terminal in order to check whether the message includes schedule information, extracting the schedule information from the message and storing the schedule information if the message includes the schedule information, and registering the schedule alarm message in a receive message list. The method of processing a schedule alarm message in a portable terminal further comprises displaying a display window including items used for displaying the stored schedule information and an alarm time when the user confirms the schedule alarm message, allowing the user to correct the schedule information and to set the alarm time by using the items displayed in the display window, and registering the corrected schedule alarm message to a schedule alarm message list in response to a schedule alarm message registration request.

26 Claims, 15 Drawing Sheets

Name :
Title :
Date :
Time :
Place :
Other :

SEND  CANCLE

FIG.3A

Name : CHONG-HEE KIM
Title : ALUMMI REUNION
Date : 04-11-05
Time : 12:30 PM
Place : ASSEMLY HALL
Other : HOPE FOR YOUR ATTENDANCE

SEND  CANCLE

FIG.3B

NAME : SON

TITLE : EXERCISE

DATE : 04-11-05

PLACE : TAEKWONDO HALL

ALARM : EVERY TWENTY MINUTE AT LEAST AN A HOUR BEFORE THE ALARM TIME

OTHER : CALL ME AFTER FINISHING EXERCISE IN TAEKWONDO HALL

[ SEND ]   [ CANCEL ]

FIG.14

METHOD OF RAISING SCHEDULE ALARM WITH AVATARS IN WIRELESS TELEPHONE

PRIORITY

This application claims the benefit of priority under 35 U.S.C. §119(a) to an application entitled "Method Of Raising Schedule Alarm With Avatars In Wireless Telephone" filed with the Korean Intellectual Property Office on Dec. 9, 2003 and assigned Serial No. 2003-89093, and to an application filed with the Korean Intellectual Property Office on Nov. 30, 2004 and assigned Serial No. 2004-99450, the entire contents of both applications being expressly incorporated herein by reference.

BACKGROUND OF THE INVENTION

1. Field of the Invention

The present invention relates to a method of processing a message in a portable terminal. More particularly, the present invention relates to a method of registering a schedule and raising an alarm for the schedule by analyzing a message received in a portable terminal.

2. Description of the Related Art

Currently available portable terminals are equipped with various functions in addition to a simple telephone function. One such function is an electronic diary function. The electronic diary function includes a schedule alarm function for managing a schedule of a user. The schedule alarm function notifies the user of the schedule at a predetermined time that is set by the user.

In order to register the schedule of the user in the portable terminal, the user selects a schedule management item from a menu, and inputs the date, time, and type of schedule (e.g., birthdays, special days to remember, appointments, among others) Therefore, when the user registers the schedule in a conventional portable terminal, the user must sequentially input information related to the schedule according to a menu. Such a registering procedure is so complex that the user may feel inconvenient when inputting data for the schedule.

In addition, when the schedule of the user has been registered in the portable terminal, the portable terminal may raise an alarm according to information related to the schedule, which is preset by the user. At this time, the portable terminal simply rings the alarm at a correct time, which is set by the user. The portable terminal may generate a signal or a melody in order to notify the user of the schedule, so the user cannot discriminate it from other signals representing an incoming call or other alarm functions. For this reason, the user must check the portable terminal in order to recognize the content of the alarm signal.

SUMMARY OF THE INVENTION

Accordingly, the present invention has been made to solve the problems described above, and others not mentioned. It is therefore an object of the present invention to provide a method of registering a schedule in a portable terminal, in which a message that includes schedule information is created in the portable terminal and transmitted to other portable terminals as a schedule alarm message in such a manner that the schedule alarm message can be registered in the portable terminal.

Another object of the present invention is to provide a method of registering a schedule in a portable terminal, in which the portable terminal analyzes a message received therein and extracts schedule information from the message if the message has schedule information, thereby registering the schedule in the portable terminal.

Still another object of the present invention is to provide a method of visually notifying a user of a schedule using avatars (e.g., graphical designs, in some instances animated, to indicate or represent an emotion or message) at a correct time registered in a portable terminal by analyzing schedule information registered in the portable terminal.

Still another object of the present invention is to provide a method of registering a schedule in a portable terminal, in which a message including schedule information is created in the portable terminal and transmitted to other portable terminals as a schedule alarm message in such a manner that the schedule alarm message can be registered in other portable terminals.

Still another object of the present invention is to provide a method of notifying a user of a schedule using an audio signal and avatars at a correct time registered in a portable terminal by analyzing schedule information registered in the portable terminal.

Still another object of the present invention is to provide a method of notifying other portable terminals of a schedule alarm message by using a control message including schedule information when transmitting the schedule alarm message to other portable terminals.

Still another object of the present invention is to provide a method of allowing a receive portable terminal to automatically register a schedule alarm message upon receiving a message including schedule information from a transmit portable terminal and to raise an alarm for a schedule at a correct alarm time.

BRIEF DESCRIPTION OF THE DRAWINGS

The above and other objects, features and advantages of the present invention will be more apparent from the following detailed description taken in conjunction with the accompanying drawings, in which:

FIGS. 3A and 3B are views illustrating a message that includes schedule information created through the procedure shown in FIG. 2;

FIG. 14 is a view of an image that illustrate a display window for a schedule alarm message.

DETAILED DESCRIPTION OF THE EXEMPLARY EMBODIMENTS

Figure 1:
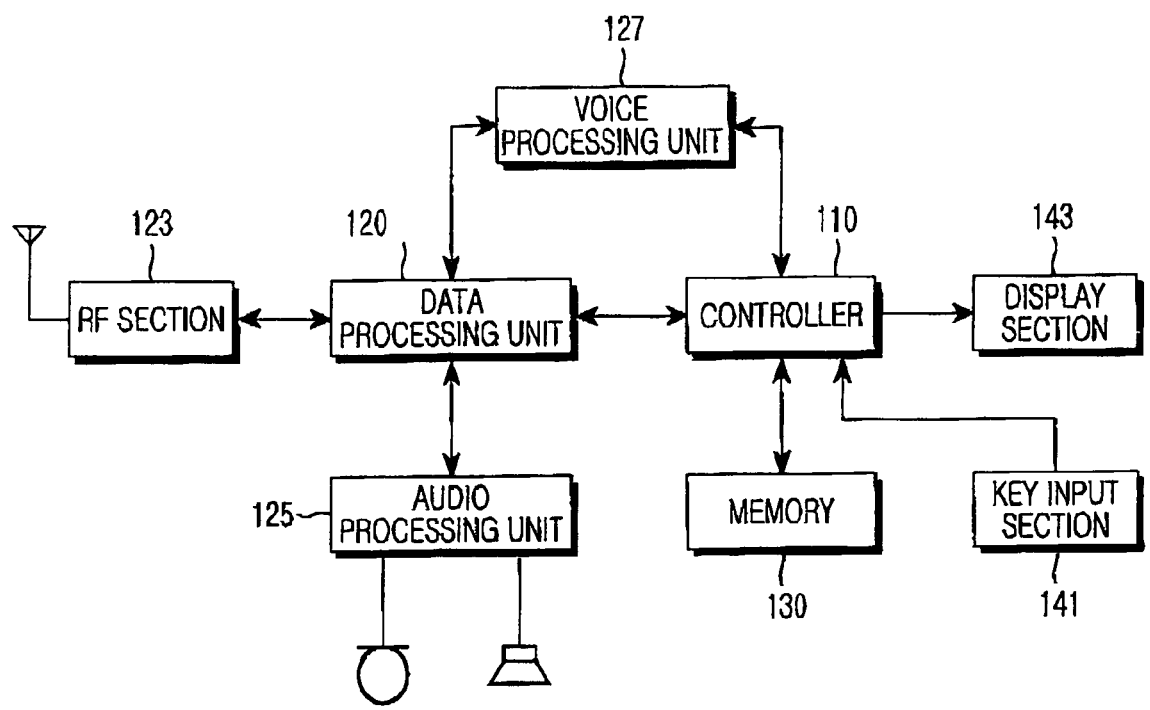
FIG. 1 is a view illustrating a structure of a portable terminal for processing a schedule alarm message according to an embodiment of the present invention.

Hereinafter, exemplary embodiments of the present invention will be described with reference to the accompanying drawings, in which like numbers represent like elements. In the following description of the present invention, a detailed description of known functions and configurations incorporated herein will be omitted for purposes of conciseness and clarity.

According to a schedule alarm function of an embodiment of the present invention, a schedule alarm message is created in the form of a text message. The schedule alarm message is registered in an originating portable terminal when the schedule alarm message is transmitted to other portable terminals. When the other portable terminals receive the schedule alarm message, the other portable terminals register the schedule alarm message. Such a schedule alarm function can be performed according to at least two methods, though, as one skilled in the art of the present invention can appreciate, there are many different ways of accomplishing the schedule alarm function. According to a first method of an embodiment of the present invention, the transmitting portable terminal transmits a message/mail by using a schedule alarm message and the receiving portable terminal receives the message/mail and registers the schedule alarm message therein so as to ring the schedule alarm. The first method can be used when the transmitting portable terminal and the receiving portable terminal are equipped with the function capable of processing the schedule alarm message. According to a second method of an embodiment of the present invention, the transmitting portable terminal sends a message/mail, and the receiving portable terminal analyzes the message/mail and automatically registers the schedule alarm message therein when the message/mail includes schedule information.

The term "message/mail" comprises text messages and message transmission services such as an short message service (SMS), an e-mail service (EMS), and an multimedia mail service MMS (MMS). In the following description, the term "message" signifies the SMS message, and the term "mail" signifies e-mail. In addition, the term "schedule alarm" signifies an alarm function generated at a predetermined time, and a term "schedule information" signifies data that comprises, among other items, a time and a place for the schedule alarm. In addition, a message that includes the schedule information means the SMS message.

According to an exemplary embodiment of the present invention, the schedule alarm message is represented with characters. A "character portable terminal" signifies a portable terminal that includes characters for displaying the state of the portable terminal and for performing the schedule alarm function by using the characters. Herein, according to an embodiment of the present invention, the term "character" comprises avatars. In the following description, the character portable terminal will be referred to as an "avatar portable terminal". The avatar portable terminal can generate the schedule alarm and can register the schedule information included in a schedule alarm message when transmitting the schedule alarm message. In addition, an avatar portable terminal that receives the schedule alarm message can register the schedule information therein by analyzing the schedule information included in the schedule alarm message. The avatar portable terminal can analyze the content of the text message in order to register the schedule information therein if the test message includes the schedule information.

Hereinafter, a procedure for transmitting the SMS message or e-mail that includes a control message in the avatar portable terminal will be described first. Then, a procedure for registering schedule information in the avatar portable terminal by analyzing the control message that includes in the SMS message or e-mail and a procedure for raising an alarm at a correct time with avatars and an audio signal will be described. Finally, a procedure for registering schedule information in the avatar portable terminal when the avatar portable terminal receives the SMS message or e-mail including the schedule information and a procedure for raising an alarm at a correct time with avatars and an audio signal will be described.

FIG. 1 is a view illustrating a structure of a portable terminal according to an embodiment of the present invention.

Referring to FIG. 1, an RF section 123 performs a wireless communication function for the portable terminal. The RF section 123 includes an RF transmitter for up-converting and amplifying a frequency of a transmitted signal and an RF receiver for low-noise amplifying and down-converting a frequency of a received signal. A data processing unit 120 includes an encoder for encoding and modulating the transmitted signal and a receiver for decoding and demodulating the received signal. The data processing unit 120 includes a MODEM and a CODEC. A voice processing unit 127 converts text data outputted from a controller 110 according to the schedule information into a voice signal.

A key input section 141 includes various functional keys for receiving alphanumeric information and for setting various functions. In addition, according to an embodiment of the present invention, the key input section 141 can have functional keys for setting a mode and generating a command language for the schedule alarm.

A memory 130 includes a program memory and a data memory. The program memory stores programs used for processing a call with the portable terminal and programs used for displaying schedule information using the avatars. The data memory temporarily stores data generated while executing the programs. In addition, according to an embodiment of the present invention, the data memory includes avatars for displaying schedule information and non-volatile memories for storing commands related to the schedule information. In an embodiment of the present invention, the data memory includes RAM and/or flash memories, among other types of memory devices.

The controller 110 controls operations of the portable terminal. In addition, the controller 110 can include the data processing unit 120. The controller 110, the data processing unit 123, an audio processing unit 125, and the voice processing unit 127 can be integrally formed as an mobile station modem (MSM) integrated circuit (for use primarily in wideband code division multiple access transmission schemes). According to an embodiment of the present invention, the controller 110 controls a text message transmission operation when transmitting the text message using avatars for performing the schedule alarm. In addition, the controller 110 analyzes the text message including the schedule information and controls an alarm operation according to the analysis result.

A display section 143 displays a state of the portable terminal under the control of the controller 110. The display section 143 can include an LCD controller, a memory for storing display data, and an LCD device. If the LCD is embodied as a touch screen type LCD, the LCD can also act as an input section.

Referring to FIG. 1, the data memory of the memory 130 includes an avatar memory. The avatar memory acts as a file system and includes a memory (or, file system) index for each avatar. In addition, the avatar memory can store avatars having various motions and expressions.

When transmitting an outgoing call by using the portable terminal, a user performs a dialing operation through the key input section 141 and the controller 110 detects the dialing operation. Thus, the controller 110 processes dial information received through the data processing unit 120 and outputs an RF signal through the RF section 123. Then, if a recipient makes a response to the outgoing call, the controller 110 detects it through the RF section 123 and the data processing unit 120. Thus, the controller 110 forms a communication path consisting of the RF section 123, the data processing unit 120 and the audio processing unit 125 that allows the user to communicate with the recipient. When transmitting the message or the mail, the user selects a message item or a mail item from a menu and creates the message or mail contents. In addition, the user also inputs a telephone number or an e-mail ID of the recipient. Then, the controller 110 detects it and controls a transmission operation for the message or mail.

When an incoming call is received in the portable terminal, the controller 110 detects the incoming call through the data processing unit 120 and raises an alarm for the incoming call. In this state, if the user pushes a communication key, the controller 110 provides an incoming call service. In addition, upon receiving the message or mail, the controller 110 analyzes the message or mail and registers the schedule information therein if the message or mail includes the schedule information. The controller 110 raises an alarm with avatars according to the schedule information registered therein. Even if the controller 110 receives a message that does not contain a control message, the controller 110 analyses the contents of the message and determines whether the message contains the schedule information. If the message contains the schedule information, the controller 110 registers the schedule information and displays the schedule information by using avatars.

Hereinafter, a procedure for creating and transmitting the SMS message including the control message for the schedule alarm in the avatar portable terminal will be described.

Figure 2:
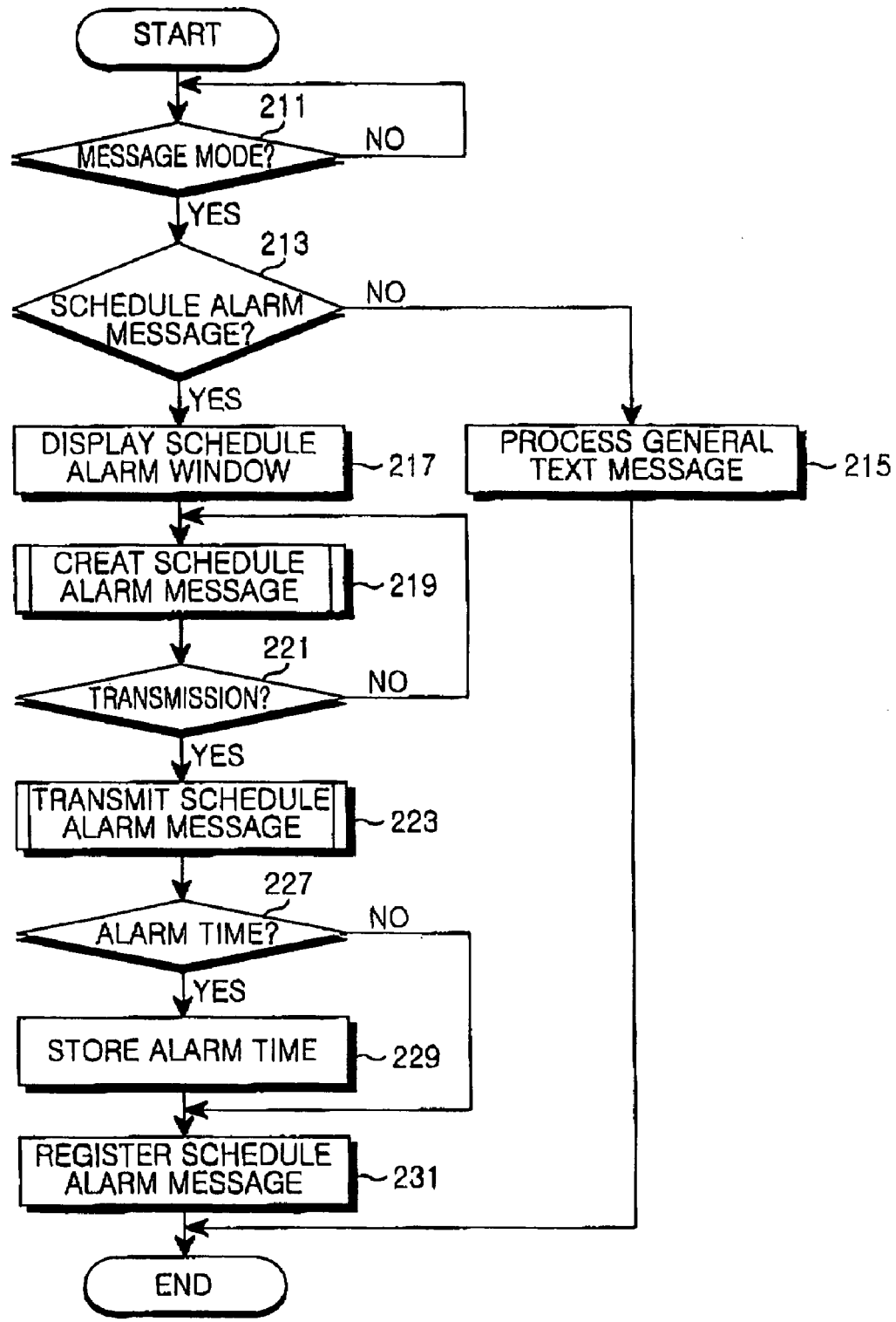
FIG. 2 is a flowchart illustrating a procedure for creating and transmitting a schedule alarm message in a portable terminal according to an embodiment of the present invention.

FIG. 2 is a flowchart illustrating the procedure for creating and transmitting the SMS message that includes the schedule alarm message in the avatar portable terminal according to an embodiment of the present invention.

Referring to FIG. 2, the user selects a message mode in decision step S211, by using the key input section 141. At this time, the message mode can include an SMS message mode and an e-mail mode. When the message mode has been selected ("yes" path from decision step 211), the controller 110 detects the message mode and displays the message mode in the display section 143. The message can be transmitted in the form of a schedule alarm message or a general text message. After checking the message mode in step 211, the controller 110 displays a menu in the display section 143 that allows the user to select the schedule alarm message or the general text message. When using the avatar portable terminal, if the user selects the message mode ("Yes" path from decision step 211), the controller 110 displays menu information for allowing the user to select the schedule alarm message or the general text message in decision step 213. If the user selects the general text message ("No" path from decision step 217), the controller 110 processes the general text message in step 215.

If it is determined in decision step 213 that the SMS message is the schedule alarm message ("Yes" path from decision step 213), the controller 110 displays a message input window in the display section 143 so as to allow the user to input the schedule alarm message (step 217) that includes schedule information (the message input window can be referred to as a schedule alarm window). The schedule alarm window can contain various items including the sender name, schedule time, location and object of the schedule. After creating the schedule alarm window that includes the above items, the controller 110 displays schedule information received by the user in the display section 413, thereby creating the schedule alarm message (step 219). At this point, if a message transmission order is generated, the controller 110 detects it (decision step 221) and transmits the schedule alarm message ("Yes" path from decision step 221) including control data representing that the transmitted message is the schedule alarm message (step 223). Then, the schedule alarm message is coded and modulated through the data processing unit 120 and outputted as an RF signal through the RF section 123.

After transmitting the schedule alarm message, the controller 110 displays a message in the display section 143 for allowing the user to input an alarm time for the schedule alarm message (decision step 227). If the user inputs the alarm time for the schedule alarm message ("Yes" path from decision step 227), the controller stores the alarm time in step 229. The alarm time can be set with at least one time information. The reason for setting the alarm time with at least one time information is to raise an alarm by at least one time before the correct time of the schedule. After the alarm time has been inputted by the user, the controller 110 registers the schedule alarm message and the alarm time (step 231). It is also possible to omit the registering of the alarm time for the schedule alarm message. In this case, if the user pushes an end key during the schedule input procedure, the controller 110 detects it and returns to step 231 in order to register the schedule alarm message.

Hereinafter, a procedure for creating and transmitting the schedule alarm message by using the avatar portable terminal will be described in detail. FIG. 3A is a view of an image that illustrates a Korean/English message input window and FIG. 3B is a view of an image that illustrates a schedule alarm message inputted into the message input window.

Referring to FIGS. 3A and 3B, when the user selects a schedule alarm message function of the portable terminal, the controller 110 displays a menu for allowing the user to create the schedule alarm message. The user can select a schedule alarm message item from the menu. In this case, the message input window is displayed in the display section 143 as shown in FIG. 3A (step 215 of FIG. 2). At this time, the message input window displays a sender name, a title of a message, a date, time, a place or a location, and an "other" entry item that allows the user to include an explanation for the schedule alarm information. The "other" entry item can be filled with additional information for the schedule, which can be made in the form of the text message. For example, when the schedule alarm message is used for notifying a conference, the message input window can be filled with information including a sender name, a conference time, a conference place, and an object of the conference.

When the above schedule alarm message has been created, the controller 110 adds control information to the schedule alarm message in order to notify a recipient of the schedule alarm message and sends the schedule alarm message to the recipient (step 223 of FIG. 2). If the schedule alarm message is in the form of the SMS message, data capacity can exceed reference data capacity due to data included in the "other" entry item. In this case, the controller 110 continuously sends the content included in the "other" entry item after transmitting a main schedule alarm message. Accordingly, it is possible to transmit the schedule alarm message regardless of the size of data while adding additional information to the schedule alarm message. Then, the schedule alarm message is coded and demodulated, and is transmitted as an RF signal.

By way of an example, if the schedule alarm message as shown in FIG. 3B has been created in step 219 of FIG. 2, the controller 110 temporarily stores the schedule alarm message. If the user does not insert data in the "name" item, a telephone number or an e-mail ID may be automatically inserted in the "name" item. In addition, the "title" item is for inserting the title of the message, so if the user does not insert data in the "title" item, data determined by the portable terminal is inserted in the "title" item. The "date" item is an essential item into which the user must insert data and the "time" item is a selective item. The "time" item can be replaced with an alarm time set by the user. The "place" item is an essential item. The "other" item is provided for allowing the user to insert messages for explaining the schedule alarm message in the form of the text message, as discussed above.

If, after the schedule alarm message has been created, the user sends a transmission order, the controller transmits the schedule alarm message as shown in FIG. 3B while adding the control information to the schedule alarm message. The schedule alarm message is as follows:

"Wsched Kim chong hee$alumni reunion$04-11-05$12:30 PM$assembly hall$hope for your attendance"

In the above schedule alarm message, "W" signifies a start of a message control for the schedule alarm registration, and "sched" is control information representing the schedule alarm message, in which a blank is formed between the "sched" and next data. In addition, "Kim chong hee$alumni reunion$04-11-05$12:30 PM$assembly hall$" is data representing the name, title, date, time and location, in which "$" is inserted between data in order to sort the data. If it is necessary to use "$" as data, data may be transmitted in the form of "$$". In addition, "hope for your attendance" is data inserted into the "other" item in the form of a text message. The "$" symbol is not provided next to the text message.

Figure 4:
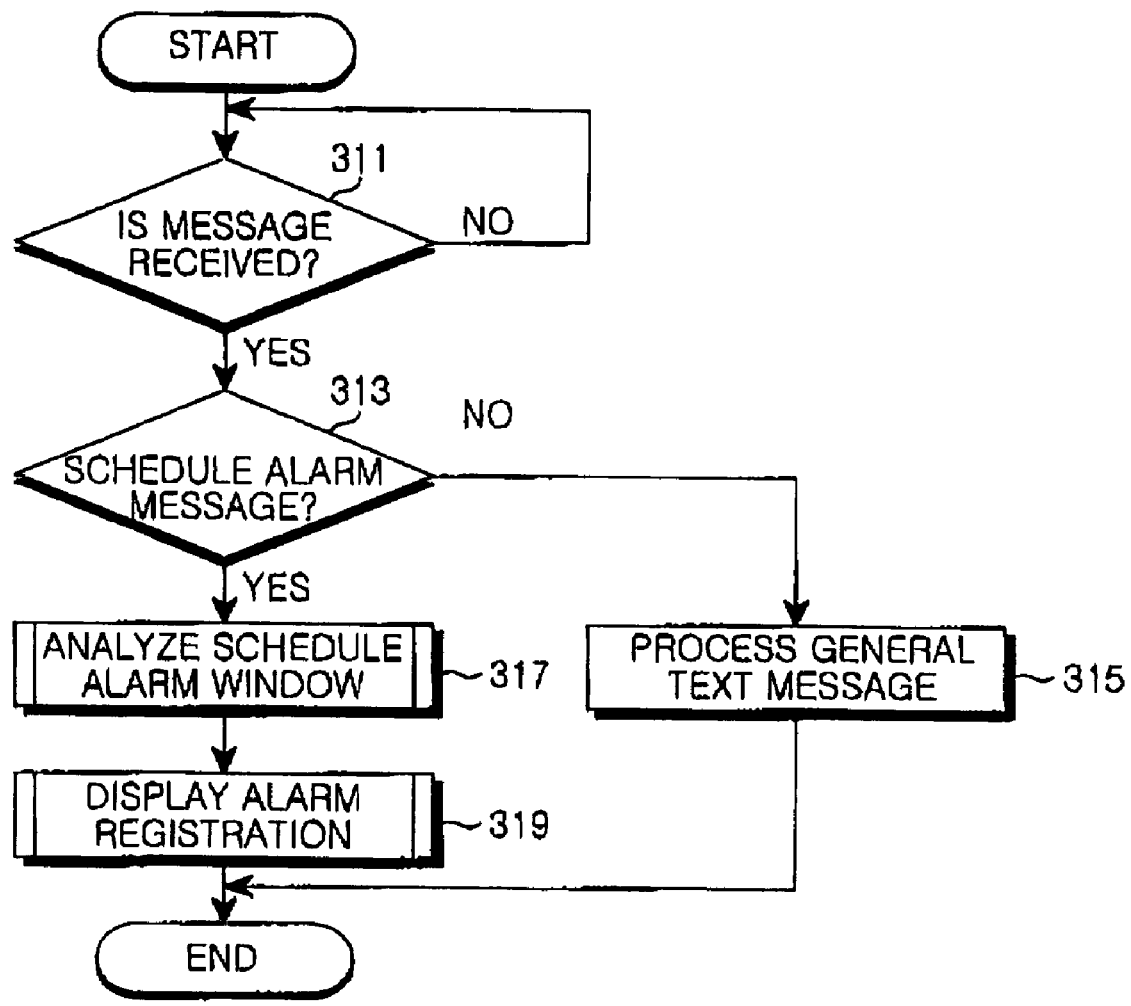
FIG. 4 is a flowchart illustrating a procedure for analyzing a schedule alarm message received in a portable terminal according to an embodiment of the present invention.

The above schedule alarm message is transmitted to other portable terminals capable of processing the schedule alarm message and is registered therein. FIG. 4 is a flowchart illustrating a procedure for registering a schedule alarm message received in a portable terminal according to an embodiment of the present invention.

Referring to FIG. 4, the received message is converted into a message using a predetermined receive frequency band through the RF section 124. The message is then transmitted to the controller 110 after being demodulated and decoded through the data processing unit 120. Then, the controller 110 detects the message in decision step 311 and analyzes it in order to verify whether the message includes the control information representing the avatar schedule alarm message (decision step 313). The control information is information such as "Wsched", that indicates the schedule alarm message. If the message does not include the control message ("No" path from decision step 313), the controller 110 processes the message as a general text message in step 315. The controller 110 analyzes the general text message and registers schedule information if the general text message includes the schedule information. In this case, the procedure as shown in FIG. 12 will be carried out to analyze the general text message and register the schedule information if the general text message includes the schedule information.

If it is determined in decision step 313 that the message includes the control information ("Yes" path from decision step 313), the controller 110 analyzes the control information included in the message (step 317) and stores information included in the schedule alarm message. Then, the controller 110 display the temporarily stored schedule alarm message in the display section 143 (step 319), and registers the temporarily stored schedule alarm message in the memory 130 after the user checks the temporarily stored schedule alarm message.

Figure 5:
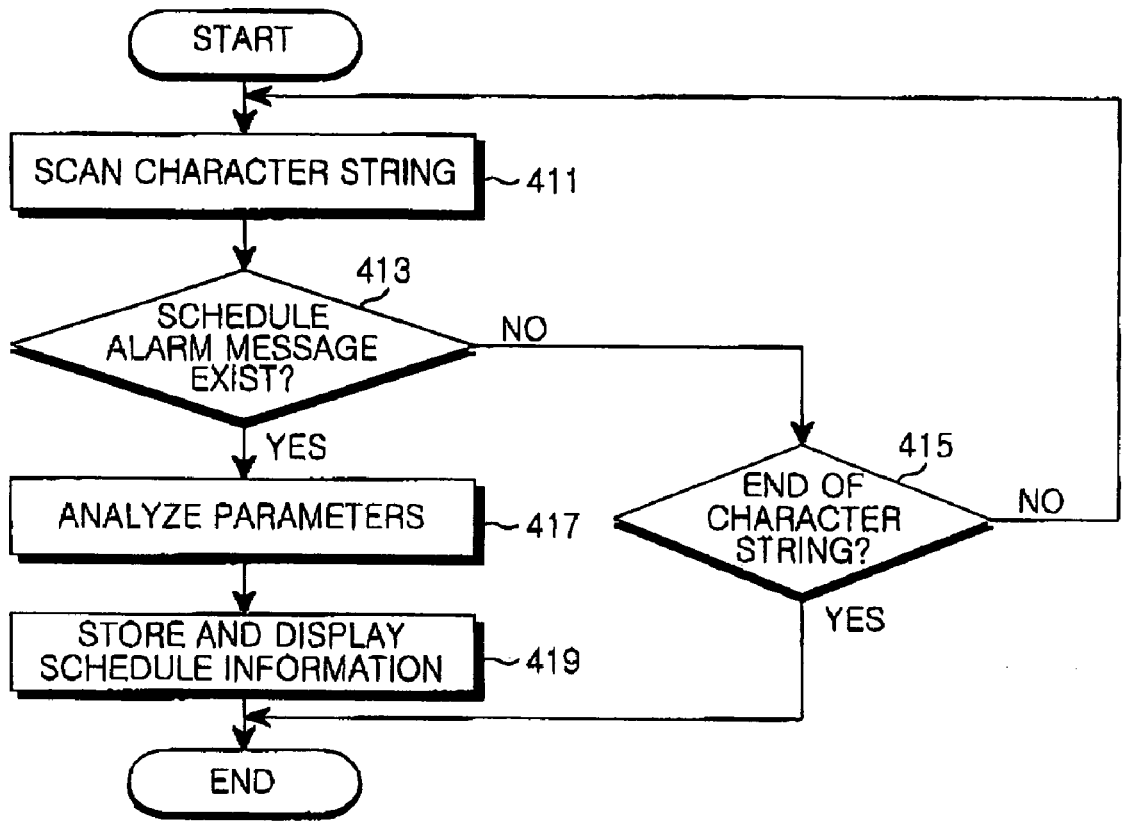
FIG. 5 is a flowchart illustrating a procedure for analyzing a schedule alarm message according to an embodiment of the present invention.

FIG. 5 is a flowchart illustrating a procedure for analyzing an avatar schedule alarm message represented as steps 313 to 317 in FIG. 4.

Referring to FIG. 5, when the text message is received in the controller 110, the controller 110 scans a character string of the text message (step 411). If the text message includes the control information, the controller 110 regards the text message as the schedule alarm message in decision step 413 and performs step 417. If, however, it is determined that the text message has no control information after analyzing the character string of the test message, the controller 110 performs step 315 shown in FIG. 4.

Upon detecting the schedule alarm message, the controller 110 analyzes parameters representing the schedule information from the schedule alarm message (step 417). The parameters representing the schedule information include the name of a sender, schedule time, place, and the other item for explaining additional information for the schedule. After analyzing the above parameters of the schedule alarm message, the controller 110 temporarily stores the information resulting from the analysis in the memory 130 and displays an icon in the display section 143 that tells the user that the schedule alarm message has been received. In addition, the controller 110 registers the schedule alarm message in a receive message list. When the information is stored in the memory 130, a telephone number of the sender and a message receive time are also stored together with the parameters.

An icon can be used in the display section 143 to tell the user that a schedule alarm message has been received. Furthermore, an icon representing the receipt of a general text message can also be used for displaying the receipt of the schedule alarm message or a different icon can be used for displaying the receipt of the two messages. According to an embodiment of the present invention, the icon displaying the receipt of the schedule alarm message is different from the icon representing the receipt of the general text message. In this case, the user of the portable terminal can determine the receipt of a schedule alarm message by simply viewing the icon, thereby allowing the user to rapidly register the schedule alarm message in the portable terminal.

In addition, the receive message list can include not only the general text message list, but also the schedule alarm message list. The general text message list can be registered in the receive message list together with or separately from the schedule alarm message list. According to an embodiment of the present invention, the text message list is registered in the receive message list together with the schedule alarm message list. In addition, an item for the schedule alarm message list is provided in a menu such that the schedule alarm message list can be individually displayed. When the text message list is registered in the receive message list together with the schedule alarm message list, an identification mark is provided for the schedule alarm message.

Figure 6:
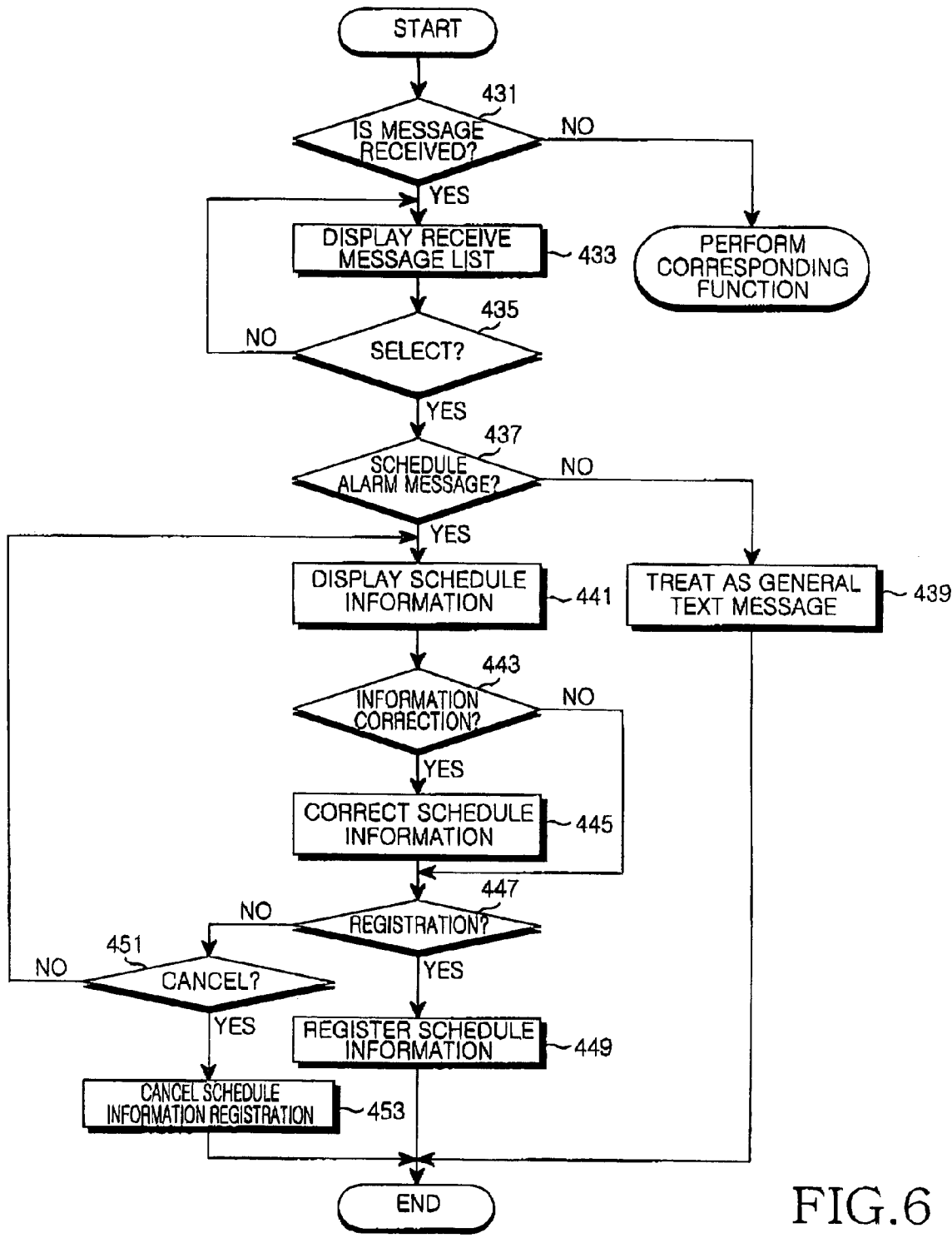
FIG. 6 is a flowchart illustrating a procedure for registering a temporarily stored schedule alarm message as a schedule alarm message.

When the portable terminal receives the above schedule alarm message, the user nearly instantaneously recognizes the receipt of the schedule alarm message through the icon displayed in the display section 143. The user of the portable terminal can then register or cancel the received schedule alarm message. FIG. 6 is a flowchart illustrating a procedure for registering a temporarily stored schedule alarm message, which is stored in the memory 130 in step 319 by means of the controller 110, in the memory 130 as a schedule alarm message.

Referring to FIG. 6, when the user selects a message check function, the controller 110 detects it (decision step 431) and displays the receive message list in the display section 143 (step 433). If the user selects a specific message from the receive message list, the controller detects it (decision step 435) and determines whether the specific message is the schedule alarm message (decision step 437). If it is determined in decision step 437 that the specific message is the general text message ("No" path from decision step 437), the controller 110 accesses the memory 130 in order to display the specific message in the display section 143 (step 439).

Figure 7A:
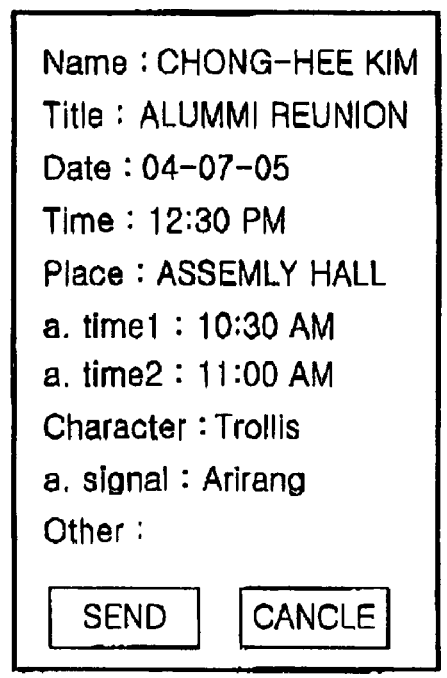
FIGS. 7A and 7B are views of images that illustrate a procedure for correcting and registering a schedule alarm message that is received in a portable terminal when performing the procedure shown in FIG. 6.

If, however, it is determined in decision step 437 that the specific message is the schedule alarm message ("Yes" path from decision step 437), the controller 110 displays the schedule alarm message, which has been analyzed through the procedure shown in FIG. 5, in the display section 143 (step 441). The schedule alarm message displayed in the display section 143 is shown in FIG. 7A. Upon receiving the schedule alarm message, the controller 110 temporarily stores schedule information contained in the schedule alarm message in the memory 130. Then, when the user selects the message check function, the controller 110 displays the schedule alarm message in the display section 143 as shown in FIG. 7A. The schedule alarm message displayed in the display section 143 further includes alarm time items for setting the alarm time. The time item of the schedule alarm message represents an appointed time for the schedule. Accordingly, in order to arrive at the appointed place in the appointed time, the schedule alarm must be generated before the appointed time. For this reason, the alarm time items are provided in the schedule alarm message in order to raise an alarm before the appointed time. In addition, as shown in FIG. 7A, at least one alarm time items are provided to allow the user to set at least one alarm time. When the user determines the alarm time, the controller displays a window in the display section 143 for allowing the user to set the alarm time. In addition, when the user has set the alarm time through the window displayed in the display section 143, the controller 110 removes the window and displays the alarm time in the alarm time items of the display section 143 as shown in FIG. 7A.

Figure 7B:
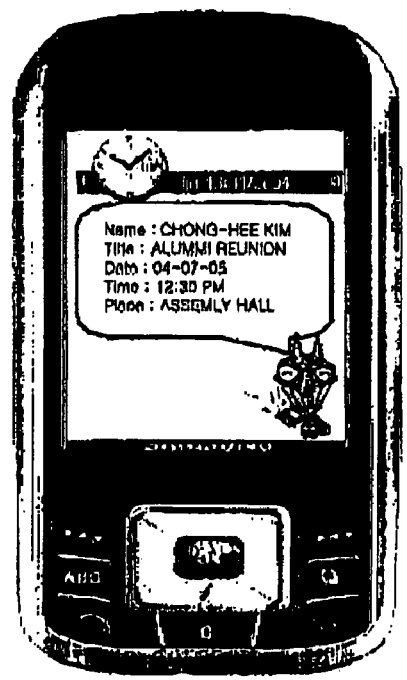
Figure 8A:
FIGS. 8A through 8D are views of images that illustrate avatars displayed in a portable terminal when a schedule alarm function is carried out according to one embodiment of the present invention.
Figure 8B:
Figure 8C:
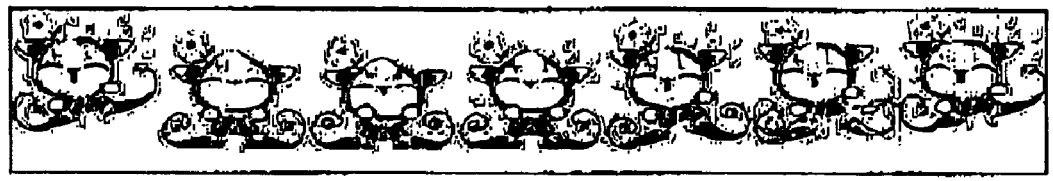
Figure 8D:

According to an embodiment of the present invention, the schedule information can be displayed with characters (avatars). FIGS. 8A through 8D are views of images that illustrate characters displayed in the portable terminal according to an embodiment of the present invention. The characters include avatars. FIG. 8A shows "candy girl" avatars, FIG. 8B shows "tinky-winky" avatars, FIG. 8C shows "tinky" avatars, and FIG. 8D shows "trollis" avatars. Herein, FIGS. 8A through 8D show examples of avatar sets according to an embodiment of the present invention that are displayed in the display section 143 when the schedule information is displayed. As shown in FIGS. 8A through 8D, the avatar portable terminal includes at least one avatar set including a plurality of avatars represented with various images for illustrating various events. According to an embodiment of the present invention, the schedule alarm message as shown in FIG. 7B can be displayed in the display section in the form of a balloon with an avatar selected from avatar sets shown in FIGS. 8A through 8D. If the user selects a specific character (avatar) in a schedule information correction mode shown in FIG. 7A, the schedule information can be displayed with the specific avatar as shown in FIG. 7B. In general, if the user does not select the specific character, a conventional schedule alarm function will be carried out instead of an avatar schedule alarm function. According to an embodiment of the present invention, however, even if the user does not select the specific character, the controller 110 selects a predetermined default avatar so as to perform the avatar schedule alarm function. In addition, the controller 110 accesses a character list stored in the memory 130 so as to display characters in the display section 143. When the user selects one of the characters, the controller 110 withdraws the character list and displays a character name in a character item provided in the display section 143 as shown in FIG. 7A.

According to an embodiment of the present invention, a user can set an alarm signal for raising a schedule alarm. Herein, the alarm signal includes ringing sounds or melodies. In addition, the melodies include music stored in the memory 130 or downloaded by the user. When the alarm signal function is selected by the user, the controller 110 displays a menu including a bell sound list and a melody list in the display section 143 in order to allow the user to select the bell sound list or the melody list. When the user selects the melody list, the controller 110 displays melodies stored in the portable terminal and MP3 music files downloaded by the user. If the user selects either a melody or bell sound from the melody list or the bell sound list, the controller 110 displays the name of the melody or bell sound in the alarm signal item as shown in FIG. 7A.

In addition, if the schedule alarm message includes information related to the time and the place for the schedule, the transmit portable terminal can transmit the schedule alarm message to the receive portable terminal while omitting other parameters. Accordingly, the user of the receive portable terminal can add the omitted parameter information to the schedule alarm message received in the receive portable terminal and can correct the parameter information contained in the received schedule alarm message. Therefore, when the user sends an order for correcting the schedule information while displaying the schedule information in step 441 (of FIG. 6), the controller 110 detects it (in decision step 443) and corrects the schedule information in step 445 ("Yes" path from decision step 443). The corrected schedule information is stored in the memory 130.

After the schedule information of the received schedule alarm message has been corrected, if the user clicks the storing button provided in the display section 143, the controller 110 detects it (decision step 447) and registers the schedule alarm message together with the alarm time in step 449 ("Yes" path from decision step 447). Thus, the message check procedure is finished. If the user does not select registration, the method proceeds to decision step 451 ("No" path from decision step 447). If the user then clicks a cancel button provided in the display section 143 ("Yes" path from decision step 451), the controller 110 cancels the registration procedure for the schedule alarm message and finishes the message check procedure in step 453. If the user does not click the cancel button provided in the display section 143 ("No" path from decision step 451), the method returns to step 441.

As shown in FIG. 6, upon receiving the schedule alarm message, the controller 110 displays the schedule information included in the schedule alarm message in the display section 143. In addition, the controller 110 adds or corrects information related to items selected by the user, thereby changing the schedule alarm message. The user then inputs data related to the alarm time for generating the schedule alarm in at least one alarm time item. After correcting each item of the schedule alarm message, if the user operates the storing button, the controller 110 of the portable terminal stores the information of the corrected schedule alarm message in the memory 130 and registers it as the schedule alarm message. If the user operates the cancel button, however, the controller 110 cancels the registration procedure for the schedule alarm message and finishes the message check operation.

In addition, according to an embodiment of the present invention, the schedule alarm can be attained in the same manner used in the conventional portable terminal and the schedule information can be visually displayed by using characters. The characters can include the avatars, which are stored in an avatar memory part of the memory 130. The schedule information can be variously displayed depending on the structures of the portable terminals.

In general, the display section of the portable terminal can be classified into two types. In cases of a slide type portable terminal, a flip type portable terminal and a bar type portable terminal, the display section is exposed to the exterior. In the case of a folder type portable terminal, the display section is not exposed to the exterior. When the schedule alarm message is displayed with the avatar, the user of the slide type portable terminal, the flip type portable terminal or the bar type portable terminal can nearly instantaneously recognize the avatar schedule alarm message. Users of the folder type portable terminal, however, may not recognize the avatar schedule alarm message if the user does not open the folder. Therefore, according to an exemplary embodiment of the present invention, the schedule alarm can be generated together with the avatars in cases of the slide type portable terminal, the flip type portable terminal or the bar type portable terminal. In addition, in the case of the folder type portable terminal, the schedule alarm is primarily generated and the avatar is displayed in the display section when the user opens the folder. If the folder type portable terminal is equipped with a dual LCD structure, however, in which display sections are provided at inner and outer surfaces of the folder, the schedule alarm can be generated together with the avatars.

Figure 9:
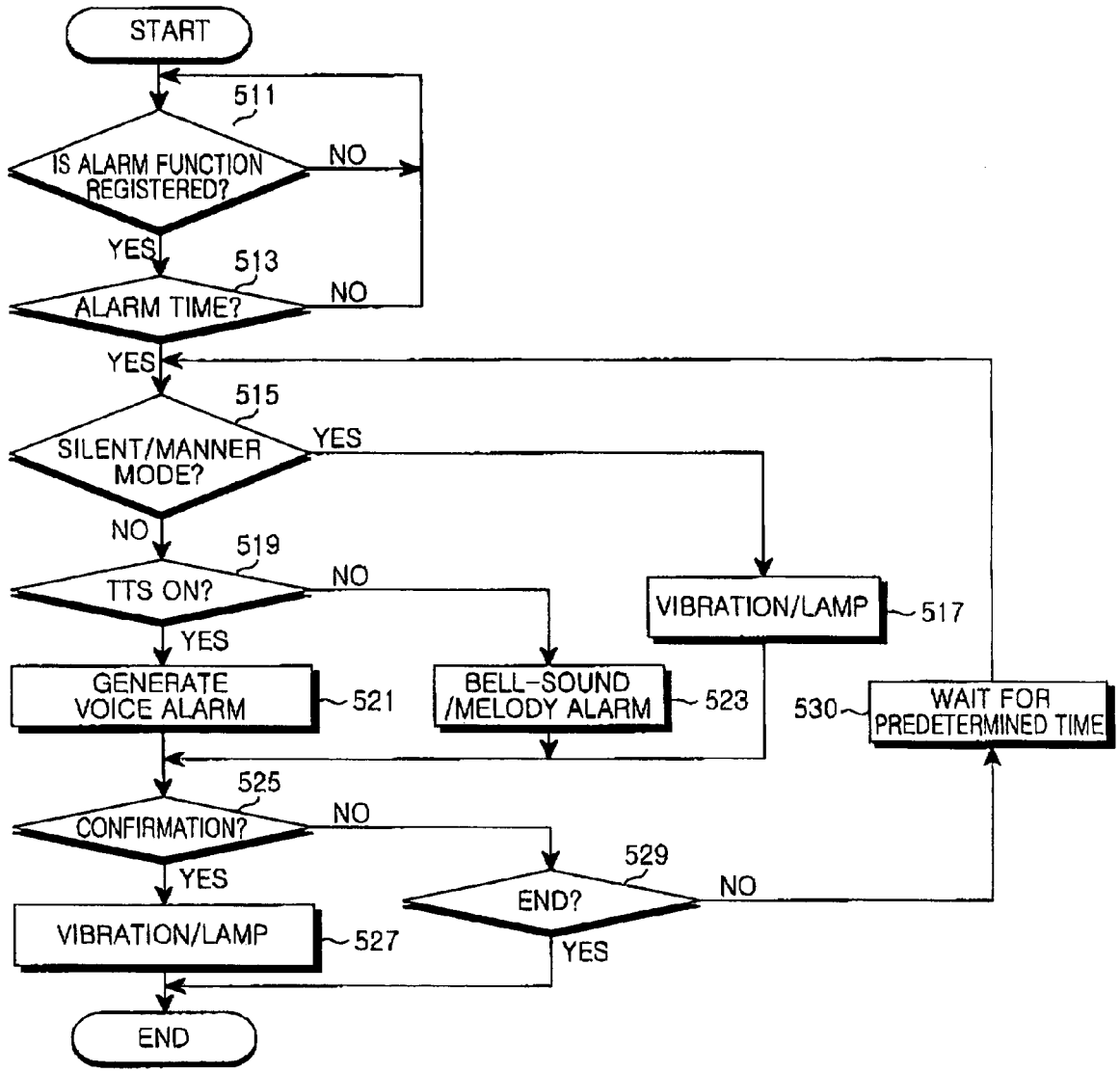
FIG. 9 is a flowchart illustrating a procedure for performing a schedule alarm function by using avatars in a portable terminal according to an embodiment of the present invention.

FIG. 9 is a flowchart illustrating a procedure for performing a schedule alarm function by using avatars in a portable terminal according to an embodiment of the present invention. FIG. 9 shows the procedure for performing an avatar schedule alarm in the slide type portable terminal, the flip type portable terminal or the bar type portable terminal.

Referring to FIG. 9, the controller 110 checks whether the schedule alarm message is stored in the memory 130 in decision step 511. If the schedule alarm message is stored in the memory 130 ("Yes" path from decision step 511), the controller 110 periodically checks whether the present time is the alarm time registered in the schedule alarm message in decision step 513. If the present time is the alarm time ("Yes" path from decision step 513), the controller 110 checks a present alarm mode (decision step 515). If the present alarm mode is set as a silent mode ("Yes" path from decision step 515), the controller 110 controls the portable terminal such that it does not generate an audible sound. If the present alarm mode is the silent mode or a manner mode, the controller 110 generates vibration or flickers a lamp so as to notify the user of the schedule alarm time (step 517). In addition, the controller 110 displays the schedule alarm message with a specific avatar as shown in FIG. 7B by selecting the specific avatar from the avatar memory part of the memory 130. As described above, the schedule alarm message displayed in the display section 143 includes the sender name, the title, time and the place related to the schedule. Other parameters for the schedule alarm message can be omitted. Since the size of data displayed in the display section 143 is limited, only essential data may be displayed in the display section 143 when transmitting the schedule message data and other parameters are displayed in the display section 143 after the schedule alarm has been displayed in the display section 143 as shown in FIG. 7B. Accordingly, the schedule alarm message as shown in FIG. 7B and data related to other items of the schedule alarm message are alternately displayed in the display section 143.

However, if it is determined in step 515 that the present alarm mode is not the silent/manner mode ("No" path from decision step 515), the controller 110 checks whether a voice alarm is possible (decision step 519). The user of the avatar portable terminal can register the voice alarm function through the voice processing unit 127 for the schedule alarm function. Therefore, if the user has registered the voice alarm function, the controller 110 detects it in decision step 519 and allows the voice processing unit 127 to sequentially output parameters included in the schedule alarm message in order to generate the voice alarm (step 521). The voice alarm can be performed with regard to all schedule information parameters or with regard to selective schedule information parameters. At the same time, the controller 110 displays the avatar in the display section 143 by selecting the avatar from the avatar memory part of the memory 130. According to an exemplary embodiment of the present invention, if the voice alarm function has been set by the user, the voice alarm is generated in relation to the data of predetermined items included in the schedule alarm message as shown in FIG. 7B, while alternately displaying the schedule information as shown in FIG. 7Bb and data related to other items in the display section 143.

If the voice alarm function has not been set by the user, however ("No" path from decision step 519), the controller 110 detects it in step 519 and performs the schedule alarm by using the bell sound or the melody. The controller 110 displays the avatar in the display section 143. The controller 110 raises an alarm by using the bell sound or the melody in step 523 while alternately displaying the schedule information as shown in FIG. 7B and data related to other items in the display section 143.

While performing steps 517, 521 and 523, the controller 110 waits for a confirmation command by the user. In the meantime, the schedule alarm can be continuously generated within a predetermined period of time set by the user or set in the portable terminal. If the controller 110 receives the confirmation command through the key input section 141 while performing the schedule alarm, the controller 110 detects it (decision step 525) and generates vibrations or flickers a lamp (step 527) in order to display the confirmation of the user for the schedule alarm message. Then, the process is finished.

If the confirmation command of the user is not received in step 525, however ("No" path from decision step 525), the controller 110 waits for a predetermined time (decision step 529) and returns to step 515 in order to perform the schedule alarm again. In this case, the schedule alarm scheme can be carried out differently from the original schedule alarm scheme. When the schedule alarm is again carried out with the voice alarm function in step 521, the user can be notified that an alarm time has passed from an original alarm time by a predetermined time. In addition, when the schedule alarm function is again carried out with the bell sound or the melody in step 523, the user can select a different bell sound or the melody from the original bell sound or melody. Also, when the schedule information is visually carried out with the avatar, an alarm time, which has passed from an original alarm time by a predetermined time, a different avatar can be displayed having, for instance, a sad or crying face.

When the schedule information is registered, a time parameter of the schedule alarm message can be different from the alarm time set by the user. The alarm time set by a transmitting subscriber can be different from the alarm time set by a receiving subscriber. This is because the receiving subscriber can set the alarm time by taking a distance from the present position of the receiving subscriber to the appointed place into consideration. Therefore, if the alarm time set in the schedule alarm message elapses by a predetermined time while performing the schedule alarm function, or if the user closes the schedule alarm function, the controller 110 detects it (decision step 529) and finishes the schedule alarm operation.

According to the above schedule alarm scheme, the schedule alarm function is carried out simultaneously with the avatar schedule alarm function from a start point of the schedule alarm. When the portable terminal performs the schedule alarm function, however, a soundless alarm, a voice alarm, a bell-sound alarm or a melody alarm is generated in steps 517, 521 and 523 at the alarm time. In addition, if the user sends the confirmation order in step 525, the avatar alarm is carried out in step 527. The soundless alarm, the voice alarm, the bell-sound alarm or the melody alarm is generated at the predetermined alarm time set in the schedule alarm message. If the user opens a folder type portable device (that is, when the user checks the schedule alarm message), the controller 110 detects it and displays a predetermined avatar in the display section 143 by selecting the predetermined avatar from the memory 130. In addition, in the case of a portable terminal provided at a front surface thereof with the display section, the avatar may be displayed in the display section only when the user sends the confirmation command after the schedule alarm has been primarily generated.

Figure 10:
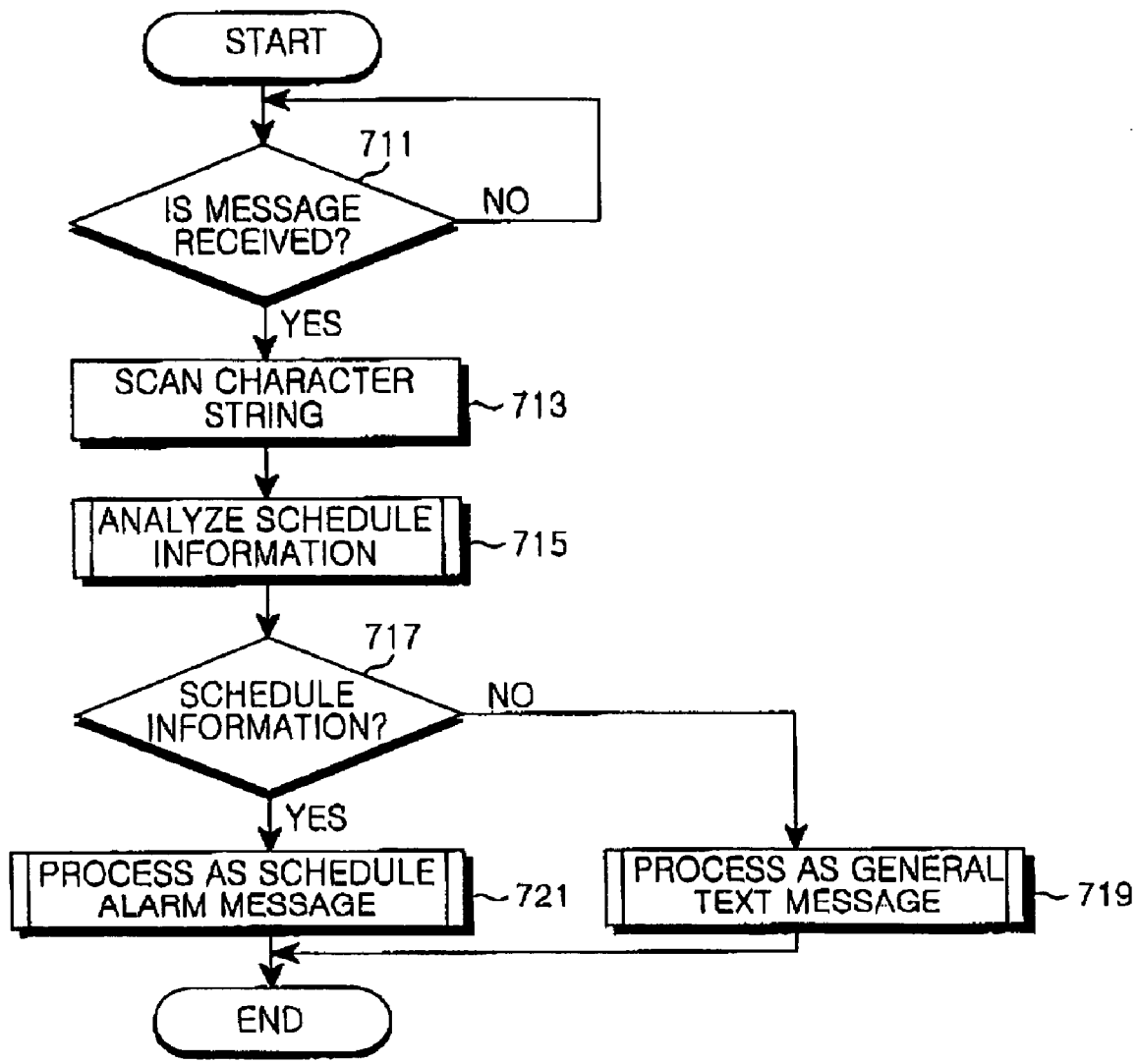
FIG. 10 is a flowchart illustrating a procedure for creating a schedule alarm message by analyzing a message received in a portable terminal according to another embodiment of the present invention.

According to a second embodiment of the present invention, the portable terminal can register the schedule information even when the portable terminal receives a general text message. FIG. 10 is a flowchart illustrating registration of the schedule information in the portable terminal according to the second embodiment of the present invention.

Referring to FIG. 10, when the text message is received in the portable terminal, the controller 110 detects it ("Yes" path from decision step 711), and scans a character string from the text message (step 713). Then, the controller 110 analyzes the scanned character string in order to check whether the text message includes the schedule information (step 715). If it is determined in decision step 717 that the text message includes the schedule information, the controller 110 registers the schedule information in the schedule alarm list (step 721). If it is determined in step 717 that the text message does not include the schedule information, however ("No" path from decision step 717), the controller 110 regards the received message as a general text message (step 719).

Figure 11:
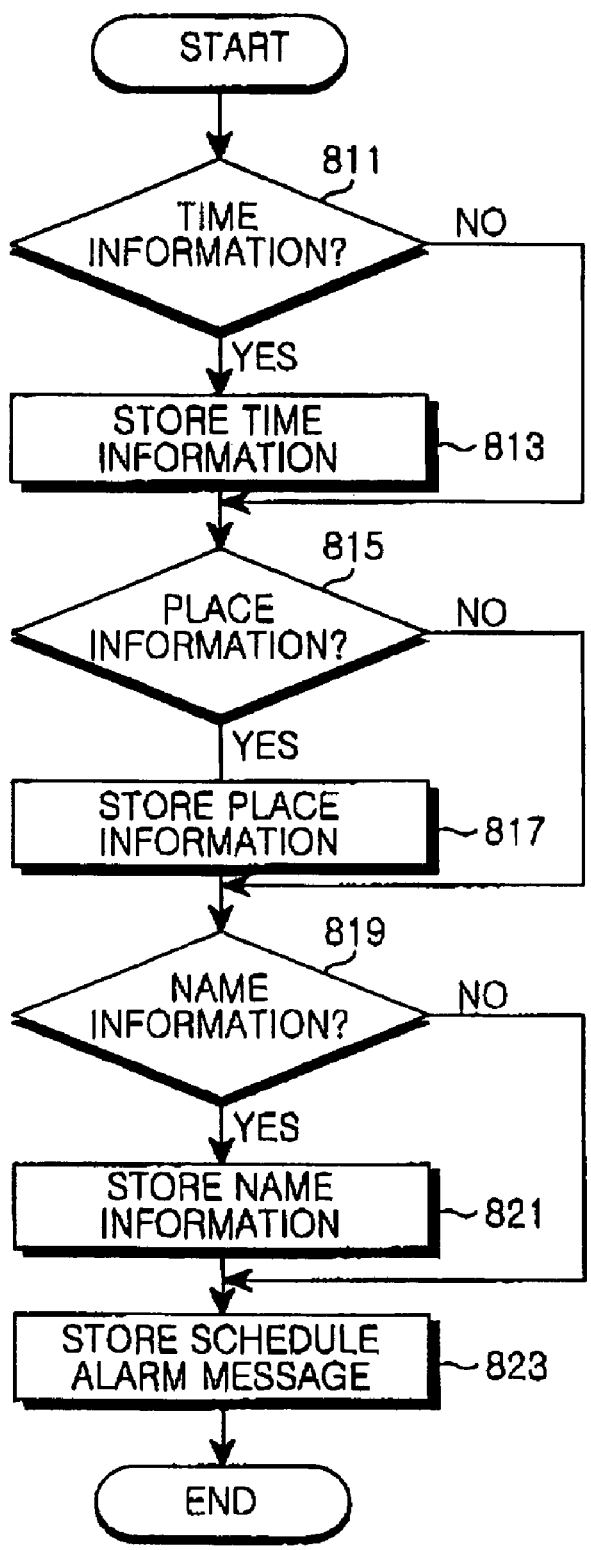
FIG. 11 is a flowchart illustrating a procedure for analyzing a schedule alarm message received in a portable terminal according to another embodiment of the present invention.
Figure 12A:
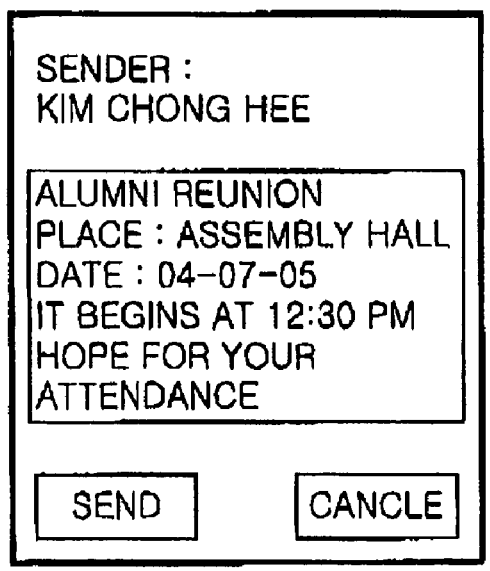
FIGS. 12A and 12B are views of images that illustrate messages displayed in a display section when performing the procedure shown in FIG. 10.
Figure 12B:
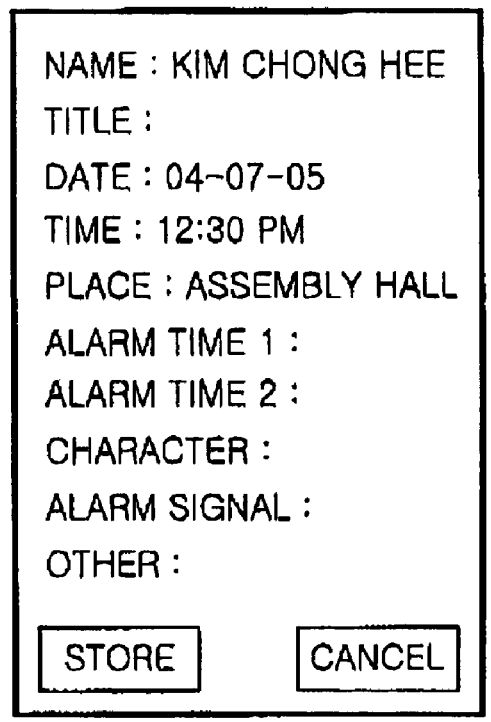

FIG. 11 is a flowchart illustrating the procedure for steps 715 to 721 shown in FIG. 10 in detail. FIG. 12A is an example of the schedule alarm messages received in the portable terminal, and FIG. 12B is a view of an image that illustrates schedule information displayed in the display section 143 when the controller 110 detects the schedule information from the text message.

Referring to FIG. 11, the controller 110 checks whether the scanned character string includes the schedule information. At this time, if the scanned character string does not include the schedule information, the controller 110 regards the message as a general text message. Herein, the schedule information includes characters or symbols representing the date, time, and place. For instance, if the text message includes data related to the time and place, the controller 110 regards the text message as a schedule alarm message. In addition, if the text message includes data related to the time and date (for example, 4:30, November 5), controller 110 regards the text message as a schedule alarm message.

Therefore, upon receiving the text message, the controller 110 checks whether the text message includes time information (decision step 811). The time information can include character data, symbols or number data representing the year, month, date, hour, and minute. For instance, if the text message includes information, such as "time: 12:30", "Apr. 11, 2005", or "12:30 PM", the controller 110 of the portable terminal regards the information as time information. If it is determined that the text message includes the time information, the controller 110 detects the time information in decision step 811, and registers the number data in the memory 130 as time parameters. If it is determined that the text message includes the time information ("Yes" path from decision step 811), the controller 110 checks whether the text message includes place information in decision step 815. Herein, the place information includes character data or symbols representing the place. Accordingly, if the text message includes the character data or symbols representing the place, the controller 110 determines that the text message includes the place information. For instance, if the text message includes information, such as "place:" or "location:", the controller 110 regards the information as the place information. If it is determined that the text message includes the place information, the controller 110 detects it (decision step 815) and registers the place information in the memory (step 817). After that, the controller 110 checks whether the text message includes name information based on a telephone number of a sender (decision step 819), and registers the name of the sender in the memory (step 821). The name information can be checked through a phone book provided in the portable terminal. If the sender has not been registered in the phone book of the receiving portable terminal, the controller 110 registers sender information (telephone number or e-mail ID) in the memory 130 instead of the name of the sender.

If it is determined that the text message includes the time information or the time information and place information, the controller 110 temporarily stores the time information or the time information and place information in the memory 130 and stores the sender information (name or telephone number) in the memory 130. Then, the controller 110 stores the schedule information as a schedule alarm message in the memory 130 and registers the schedule alarm message in the receive message list.

If, for example, the text message as shown in FIG. 12A is received in the portable terminal, the controller 110 performs steps 713 to 715 shown in FIG. 10, thereby scanning the character string of the text message in order to check whether the text message includes the schedule information. If the text message includes the schedule information, the controller 110 extracts and stores the schedule information through performing the procedure as shown in FIG. 11. The procedure for analyzing and storing the schedule information is as follows. In FIG. 12A, the time information is represented as "date: Apr. 11, 2001 " and "12:30 pm". The controller 110 scans the character string from the received message and regards the character string "date: Apr. 11, 2001 " and "12:30 pm" as the time information and stores the time information through (steps 811 and 813). In FIG. 12A, the place information is represented as "place: assembly hall". The controller 110 regards the character string "place: assembly hall" as the place information and stores the place information (steps 815 and 817). Then, if the sender information has been registered in the phone book provided in the portable terminal, the controller 110 selects the name information based on the sender information and stores the name information (decision step 819 and step 821). If the sender information is not registered in the phone book, the controller stores the sender information (telephone number or e-mail ID) as the name information.

If the portable terminal receives the message as shown in FIG. 12A, the controller 110 can determine the time information and place information. In addition, if the received message includes only the date information and/or the time information, the controller 100 may regard the received message as the schedule alarm message. In this case, the controller 110 only stores the time information without performing the procedure for storing the place information, thereby creating the schedule alarm message.

After that, the controller 110 stores the schedule information in the memory 130 as the schedule alarm message, and registers the schedule alarm message in the receive message list. In addition, the controller 110 creates an icon notifying a reception of the schedule alarm message and displays the icon in the display section 143. One example of the registered schedule alarm messages is shown in FIG. 12B. If the controller 110 cannot find the place information from the received message, data for the place information is not displayed in the place item of the schedule alarm message. The schedule alarm message as shown in FIG. 12B can be registered in the memory 130 as the schedule information if the user confirms the schedule alarm message. If the user selects the schedule alarm message through the receive message list after checking the message or the icon displayed in the display section 143 when the message has been received in the portable terminal, the controller 110 displays the schedule alarm message as shown in FIG. 12B in the display section 143.

The procedure for correcting and registering the schedule alarm message is shown in FIG. 6. After selecting the schedule alarm message, the user corrects the schedule information of the schedule alarm message and sets a real alarm time and an alarm signal (bell-sound/melody). Then, the user registers the corrected schedule alarm message.

As mentioned above, when the text message has been received in the portable terminal, the controller performs the procedures shown in FIGS. 10 and 11 so as to extract information parameters from the text message. Then, the controller 110 creates and stores the schedule alarm message based on the information parameters and registers the schedule alarm message in the receive message list while displaying the icon notifying the reception of the schedule alarm message in the display section. Then, the controller 110 performs the procedure as shown in FIG. 6 so as to correct the schedule information of the schedule alarm message and to set the alarm time, the avatar and the alarm signal. After that, the controller 110 registers the corrected schedule alarm message in the memory in such a manner that the alarm signal can be generated with the avatar at the alarm time through the procedure as shown in FIG. 8.

Although the above description has been made in relation to the avatar portable terminal capable of transmitting the schedule alarm message, the schedule alarm message can be processed by using a general portable terminal. In this case, the step of selecting the avatar will be omitted from the procedure for correcting and registering the schedule alarm message as shown in FIG. 6. Accordingly, the schedule alarm message can be communicated between general portable terminals so as to allow the general portable terminals to perform the schedule alarm function. In addition, the receive portable terminal can perform the schedule alarm function by detecting the schedule information from the message transmitted thereto from the transmit portable terminal.

According to the method described above, when the transmit portable terminal transmits the schedule alarm message, the receive portable terminal checks the schedule alarm message and determines whether it is necessary to register the schedule alarm message. Accordingly, the user of the receive portable terminal cannot recognize the schedule alarm message if the user does not check the schedule alarm message. Thus, it is necessary for the receive portable terminal to automatically register the schedule alarm message upon receiving the schedule alarm message from the transmit portable terminal. When parents manage the schedule of their children from a remote place, it may occur to the parents that they cannot communicate with their children at a specific time. If this occurs, the method described above is very useful. In addition, the method described above is also very useful when it is necessary to simultaneously send urgent schedule information to a plurality of workers.

In order to employ the schedule alarm scheme described above, it is preferable in an exemplary embodiment of the present invention for the receive portable terminal to previously register subscriber information in order to automatically register the schedule alarm message upon receiving the schedule alarm message. For example, telephone numbers of the parents are previously registered in portable terminals of children as an auto-register subscriber phone number, such that messages from the subscriber phone number is automatically registered as the schedule alarm message. In addition, in a work place, specific phone numbers can be registered in portable terminals of workers as the auto-register subscriber phone number.

In addition, it is preferable in an exemplary embodiment of the present invention if the user of the transmit portable terminal transmits the schedule alarm message together with an alarm time by storing the alarm time in a display window for displaying the schedule alarm message. If the user of the transmit portable terminal wishes to automatically register the schedule alarm message in the receiver portable terminal, the user of the transmit portable terminal selects a message auto-register item from a menu. If the message auto-register item is selected, the controller 110 displays the display window in the display section 140 so as to allow the user to input the date, time, place, alarm time and other used for inputting a simple message. Accordingly, the user of the transmit portable terminal can input schedule information for each item displayed in the display window, thereby creating the schedule alarm message. Then, the created schedule alarm message is transmitted to a predetermined subscriber.

The receive portable terminal previously sets information of subscribers for auto-registering the schedule alarm message and stores the information of subscribers in the memory 130. Herein, the subscriber information includes a telephone number or an e-mail address. For instance, the transmit portable terminal is the portable terminals of the parents and the receive portable terminal is the portable terminals of children. The information about the portable terminals of the children is stored in the portable terminals of the parents as auto-register schedule information, and information about the portable terminals of the parents is also stored in the portable terminals of the children as auto-register schedule information.

Thus, upon receiving the schedule alarm message, the receive portable terminal checks whether the sender of the schedule alarm message is an auto-register subscriber. If it is determined that the sender is the auto-register subscriber, the receive portable terminal automatically stores the schedule information contained in the received schedule alarm message. As described above, the information to be registered includes the subscriber information of the sender, date, time, place, alarm time and a brief message for the schedule. Accordingly, it is not necessary for the user of the receive portable terminal to check and register the schedule alarm message. The schedule information of the schedule alarm message is automatically registered in the receive portable terminal and the receive portable terminal can automatically raise an alarm at the alarm time set by the transmit portable terminal while displaying the schedule alarm message.

Figure 13:
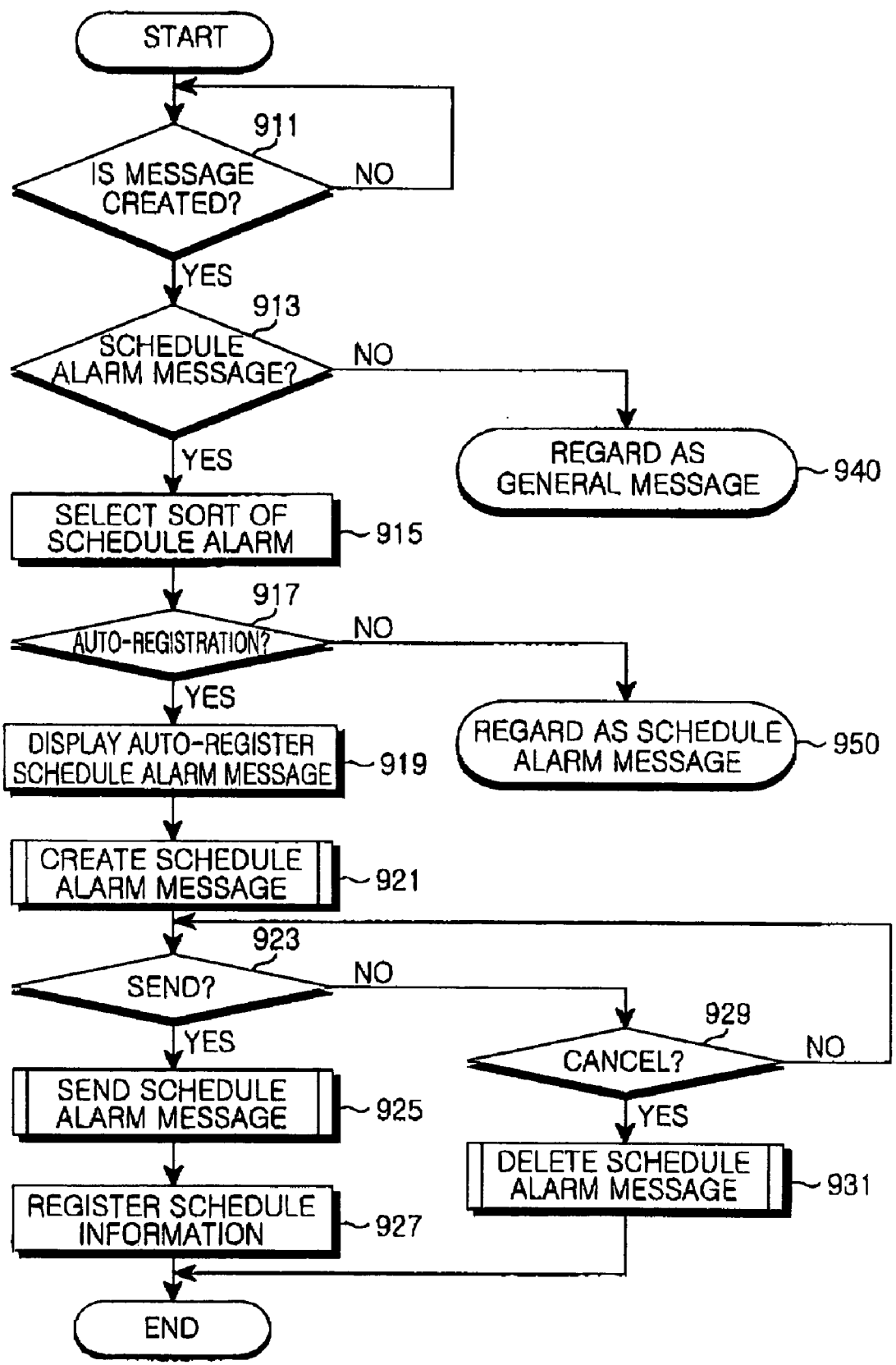
FIG. 13 is a flowchart illustrating a procedure for processing a schedule alarm message in a portable terminal according to another embodiment of the present invention.

FIG. 13 is a flowchart illustrating a procedure for creating and transmitting an auto-register schedule alarm message in a portable terminal according to a third embodiment of the present invention, and FIG. 14 is a view illustrating a display window displayed in the display section 140 for a schedule alarm message while creating the auto-register schedule alarm message as shown in FIG. 13.

Referring to FIGS. 13 and 14, when the schedule alarm message is created, the controller 11 detects it through steps 911 and 913, and checks whether the schedule alarm message is the auto-register schedule alarm message (step 915). The user can create the schedule alarm message and the auto-register schedule alarm message. If the user selects the schedule alarm message, the controller 110 detects it through step 915 and decision step 917, and creates the schedule alarm message in step 950. The procedure for creating and transmitting the schedule alarm message is identical to the procedure shown in FIG. 2.

In addition, if it is determined in steps 915 and 917 that the user selects the auto-register schedule alarm message, the controller 110 displays the auto-register schedule alarm message in the display window as shown in FIG. 14. The display window shown in FIG. 14 further includes an item for an alarm time as compared with the display window shown in FIGS. 3A and 3B. Then, the controller 110 creates the auto-register schedule alarm message while storing the schedule information inputted into the display window (step 921). Herein, the procedure for creating the auto-register schedule alarm message is substantially identical to the procedure shown in FIG. 2, except for a step for inputting the alarm time.

After creating the auto-register schedule alarm message, the controller 110 waits for the send command from the user. If the user orders the send command, the controller 110 sends the auto-register schedule alarm message (step 925). The auto-register schedule alarm message can use the control command language ("Sched") identical to that of the schedule alarm message, or can use an exclusive command language ("AutoSched"). The auto-register schedule alarm message further includes the alarm time. If the user does not input data for the alarm time, the controller 110 sets the alarm time as a preset alarm time.

In addition, in step 925, the controller 110 can instantaneously transmit the auto-register schedule alarm message or can transmit the auto-register schedule alarm message after checking the information of the receiver. In this case, the controller 110 checks whether the receiver is previously registered for the auto-register schedule alarm message. If the receiver is not the previously registered subscriber, the controller 110 displays an error message. The controller 110 only transmits the auto-register schedule alarm message when the receiver is the previously registered subscriber. After transmitting the auto-register schedule alarm message, the controller 110 registers the schedule information (step 927).

Figure 15:
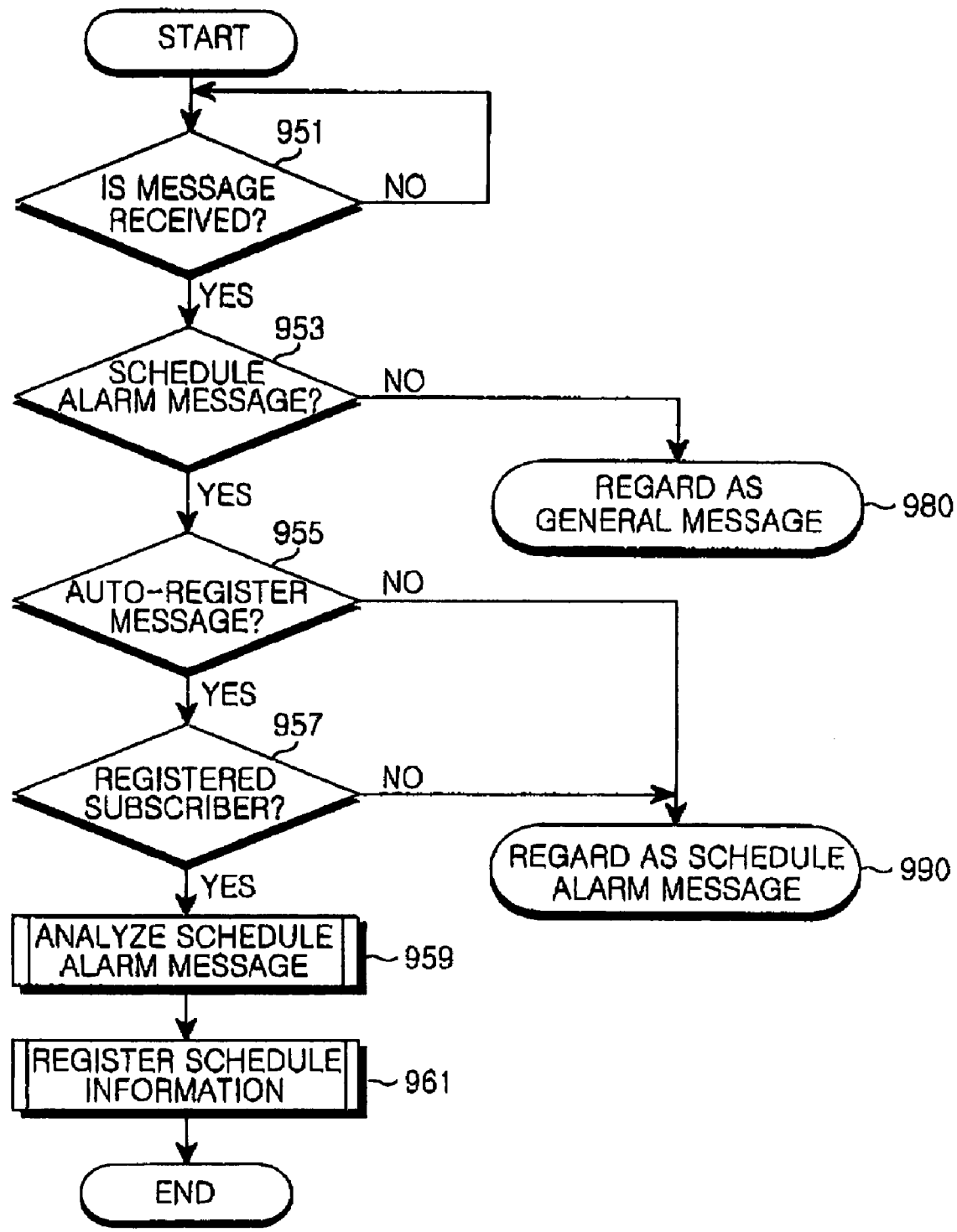
FIG. 15 is a flowchart illustrating a procedure for processing a schedule alarm message received in a portable terminal.

FIG. 15 is a flowchart illustrating a procedure for processing the schedule alarm message received in the receive portable terminal.

Referring to FIG. 15, upon receiving the schedule alarm message, the controller 110 detects it (decision step 951 and 953) and checks whether the schedule alarm message is the auto-register schedule alarm message. At this time, the schedule alarm message can be detected by checking the control command language of the schedule alarm message. If the auto-register schedule alarm message uses the control command language identical to that of the schedule alarm message, the controller 110 can detect the auto-register schedule alarm message based on the alarm time. If the schedule alarm message is received in the receive portable terminal, the controller 110 detects it (decision step 955) and processes the schedule alarm message (step 990). The procedure for processing the schedule alarm message in step 990 is identical to the procedure shown in FIGS. 4 to 6.

In addition, it is determined in decision step 955 that the auto-register schedule alarm message is received in the receive portable terminal, the controller 110 checks whether the sender of the auto-register schedule alarm message is a previously registered subscriber for the auto-register schedule alarm message (decision step 957). If the sender is not the previously registered subscriber, the controller 110 regards the received auto-register schedule alarm message as an error or a general schedule alarm message. According to the preferred embodiment of the present invention, if it is determined in decision step 957 that the sender is not the previously registered subscriber, the controller 110 regards the received message as the general schedule alarm message and processes the general schedule alarm message (step 990). If it is determined in decision step 957 that the sender is the previously registered subscriber, however, the controller 10 analyzes the schedule alarm message (step 959) through the procedure identical to the procedure shown In FIG. 5, and automatically registers the analyzed schedule information in the memory 130 (step 961). The schedule information includes data for the alarm time for raising an alarm in a correct time. If the schedule information does not include the alarm time data, the controller 110 sets the alarm time to a preset alarm time.

As mentioned above, according to the third embodiment of the present invention, the schedule alarm message transmitted to the receive portable terminal from the transmit portable terminal can be automatically registered in the receive portable terminal.

The auto-register schedule alarm message can be transmitted to the receive portable terminal from the transmit portable terminal while using an exclusive control command language different from the control command language of the schedule alarm message. In this case, the controller 110 of the receive portable terminal can discriminate the auto-register schedule alarm message from the schedule alarm message by checking the control command language. In addition, after automatically registering the auto-register schedule alarm message with the alarm time included in the auto-register schedule alarm message, the controller 110 raises an alarm at the alarm time while displaying the corresponding schedule information in the display section. If the auto-register schedule alarm message uses the exclusive control command language different from the control command language of the schedule alarm message, the user of the transmit portable terminal may not input the data for the alarm time. In this case, the controller 110 of the receive portable terminal may set the alarm time to a preset alarm time (for example, every twenty minute if it lefts a hour before the alarm time).

In addition, if the auto-register schedule alarm message uses the exclusive control command language different from the control command language of the schedule alarm message, the controller 110 of the receive portable terminal can detect the type of received message by detecting an existence of the alarm time in the received message. In this case, the user of the transmit portable terminal must transmit the message together with information related to the alarm time.

Accordingly, the procedure of processing the schedule alarm message according to the third embodiment of the present invention is very useful when the user of the transmit portable terminal suddenly notifies the user of the receive portable terminal of the schedule.

As described above, according to the embodiments of the present invention, the schedule alarm message can be transmitted from the transmit avatar portable terminal to receive avatar portable terminals in such a manner that the schedule alarm message can be registered in the transmit and receive avatar portable terminals. The receive avatar portable terminal can perform the schedule alarm function with the avatar based on the schedule alarm message transmitted thereto from the transmit avatar portable terminal. At this time, the schedule alarm function can be carried out by using the voice signal and the avatar. In addition, the avatar portable terminal can register the schedule information based on the text message transmitted thereto from other avatar portable terminals or general portable terminals if the text message includes the schedule information. The schedule alarm can be generated with the avatar at a predetermined alarm time. In addition, when receiving the text message from other portable terminals, the avatar portable terminal analyzes the text message so as to check whether the text message includes the schedule information. If the text message includes the schedule information, the controller of the avatar portable terminal waits for confirmation of the user for registering the schedule information. If the user regards the schedule information as the schedule alarm message, the controller registers the schedule information in the schedule alarm message list after correcting the contents of the schedule information.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting and registering a schedule alarm message in a portable terminal, in which the transmitted schedule alarm message can be later received and then registered manually or automatically by another portable terminal capable of handling the schedule alarm message, the method comprising the steps of:
    displaying a message input window for allowing a user to input schedule information when the user selects a schedule alarm message mode;
    creating a message for a schedule alarm by using the schedule information including a time, a place and a name inputted into the message input window by the user;
    transmitting the schedule alarm message to another portable terminal while adding control information, which indicates to the another portable terminal that the message is the schedule alarm message or an auto-register schedule alarm message; and
    registering the schedule alarm message at the other portable terminal, so that the other portable terminal raises an alarm based on the schedule information included in the schedule alarm message.

2. The method as claimed in claim 1, wherein the message input window displays items for date, time, place, sender name, and additional information about a schedule, and further includes an alarm time if the message is the auto-register schedule alarm message.

3. The method as claimed in claim 2, wherein the message input window is provided with a send button for transmitting the schedule alarm message and a cancel button for canceling the schedule alarm message.

4. A method of processing a schedule alarm message in a portable terminal, the method comprising:
    displaying a message input window for allowing a user to input schedule information when the user selects a schedule alarm message mode;
    creating a message for a schedule alarm by using the schedule information including a time, a place and a name inputted into the message input window by the user;
    transmitting the message while adding control information, which indicates that the message is the schedule alarm message, to the message in a message transmission mode;
    storing the schedule information included in the schedule alarm message when receiving the schedule alarm message and registering the schedule alarm message in a receive message list;
    displaying a display window including items used for displaying the stored schedule information and an alarm time when the user confirms the schedule alarm message;
    allowing the user to correct the schedule information and to set the alarm time by using the items displayed in the display window; and
    registering the corrected schedule alarm message to a schedule alarm message list in response to a schedule alarm message registration request.

5. The method as claimed in claim 4, wherein the display window comprises items for allowing the user to select a date, a time, a place, a sender name, an other item that is used for displaying additional information about the schedule alarm message, and at least one alarm time.

6. The method as claimed in claim 5, further comprising:
    raising an alarm at a predetermined alarm time while displaying the schedule information after the schedule alarm message is registered, wherein the alarming step comprises:
        checking an alarm mode at the predetermined alarm time;
        representing the schedule information in a soundless manner when the alarm mode is a soundless alarm mode; and raising the alarm with the predetermined alarm signal while displaying the schedule information when the alarm mode is not the soundless alarm mode.

7. The method as claimed in claim 6, further comprising:
converting the schedule information into a voice signal while displaying the schedule information if the alarm mode is a voice mode.

8. The method as claimed in claim 4, wherein the display window further comprises an item for allowing the user to select a character, which is displayed when a schedule alarm is generated, and a name of a selected character is stored when correcting the schedule alarm message.

9. The method as claimed in claim 8, wherein the character comprises avatars.

10. The method as claimed in claim 9, further comprising:
raising an alarm at a predetermined alarm time while displaying the schedule information after the schedule alarm message is registered, wherein the alarming step comprises:
checking an alarm mode at the predetermined alarm time;
representing the schedule information in a soundless manner while displaying the schedule information with the avatar when the alarm mode is a soundless alarm mode; and
raising the alarm with the predetermined alarm signal while displaying the schedule information with the avatar when the alarm mode is not the soundless alarm mode.

11. The method as claimed in claim 4, wherein the display window further comprises an item for allowing the user to select an alarm signal that is generated when a schedule alarm function is carried out and wherein the alarm signal is stored when correcting the schedule alarm message.

12. The method as claimed in claim 11, wherein the alarm signal comprises a tone signal, a melody, or music.

13. The method as claimed in claim 4, wherein the display window comprises a send button for transmitting the schedule alarm message and a cancel button for canceling the schedule alarm message.

14. A method of processing a schedule alarm message in a portable terminal, the method comprising:
analyzing a message when the message is received in the portable terminal in order to check whether the message includes schedule information;
extracting the schedule information from the message and storing the schedule information if the message includes the schedule information, and registering the schedule alarm message in a receive message list;
displaying a display window that includes items used for displaying the stored schedule information and an alarm time when the user confirms the schedule alarm message;
allowing the user to correct the schedule information and to set the alarm time by using the items displayed in the display window; and
registering the corrected schedule alarm message to a schedule alarm message list in response to a schedule alarm message registration request.

15. The method as claimed in claim 14, further comprising:
displaying an icon representing an incoming of the schedule alarm message after registering the schedule alarm message in the receive message list.

16. The method as claimed in claim 14, wherein the display window comprises items for allowing the user to select a date, a time, a place, a sender name, an other item that is used for displaying additional information about the schedule alarm message, and at least one alarm time.

17. The method as claimed in claim 16, wherein the display window comprises a send button for transmitting the schedule alarm message and a cancel button for canceling the schedule alarm message.

18. The method as claimed in claim 16, further comprising:
raising an alarm at a predetermined alarm time while displaying the schedule information after the schedule alarm message is registered, wherein the alarming step comprises:
checking an alarm mode at the predetermined alarm time;
representing the schedule information in a soundless manner when the alarm mode is a soundless alarm mode; and
raising the alarm with the predetermined alarm signal while displaying the schedule information when the alarm mode is not the soundless alarm mode.

19. The method as claimed in claim 18, further comprising:
converting the schedule information into a voice signal while displaying the schedule information if the alarm mode is a voice mode.

20. The method as claimed in claim 14, wherein the display window comprises an item for allowing the user to select a character that is displayed when a schedule alarm is generated and wherein a name of a selected character is stored when correcting the schedule alarm message.

21. The method as claimed in claim 20, wherein the character comprises avatars.

22. The method as claimed in claim 21, further comprising:
raising an alarm at a predetermined alarm time while displaying the schedule information after the schedule alarm message is registered, wherein the alarming step comprises:
checking an alarm mode at the predetermined alarm time;
representing the schedule information in a soundless manner while displaying the schedule information with the avatar when the alarm mode is a soundless alarm mode; and
raising the alarm with the predetermined alarm signal while displaying the schedule information with the avatar when the alarm mode is not the soundless alarm mode.

23. The method as claimed in claim 14, wherein the display window comprises an item for allowing the user to select an alarm signal that is generated when a schedule alarm function is carried out and wherein the alarm signal is stored when correcting the schedule alarm message.

24. The method as claimed in claim 23, wherein the alarm signal comprises a tone signal, a melody, or music.

25. A method of processing a schedule alarm message in a portable terminal, the method comprising:
displaying a display window for allowing a user to input schedule information when the user selects a schedule alarm message mode;
creating a message for a schedule alarm by using the schedule information including a time, a place and a name inputted into the display window by the user;
transmitting the message while adding control information that indicates that the message is the schedule alarm message, to the message in a message transmission mode;
analyzing the schedule alarm message upon receiving the schedule alarm message, storing the schedule information of the analyzed schedule alarm message if a sender of the schedule alarm message is previously registered as a subscriber for automatically registering the schedule alarm message, and registering an alarm time included in the schedule alarm message in a schedule alarm list; and raising an alarm at the alarm time while displaying the schedule alarm message.

26. The method as claimed in claim 25, further comprising:

storing the schedule information contained in the schedule alarm message and displaying an incoming of the schedule alarm message if the sender of the schedule alarm message is not a previously registered subscriber;

displaying a display window having items used for displaying the stored schedule information and an alarm time upon receiving a schedule alarm message confirmation request;

allowing the user to correct the schedule information and to set the alarm time by using the items displayed in the display window; and registering the corrected schedule alarm message to a schedule alarm message list upon receiving a schedule alarm message registration request.

* * * * *

UNITED STATES PATENT AND TRADEMARK OFFICE
CERTIFICATE OF CORRECTION

PATENT NO. : 7,650,169 B2  Page 1 of 1
APPLICATION NO. : 11/007170
DATED : January 19, 2010
INVENTOR(S) : Seo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Twenty-eighth Day of December, 2010

David J. Kappos
*Director of the United States Patent and Trademark Office*